(12) United States Patent
Kuo et al.

(10) Patent No.: US 6,838,654 B2
(45) Date of Patent: Jan. 4, 2005

(54) PHOTODETECTION SYSTEM AND CIRCUIT FOR AMPLIFICATION

(75) Inventors: Brian N. Kuo, Saratoga, CA (US); Ing-Jye Lan, Saratoga, CA (US); Koon Wing Tsang, Fremont, CA (US); Pei-Ling Hsu, Sunnyvale, CA (US)

(73) Assignee: Capella Microsystems, Inc., San Jose, CA (US)

( * ) Notice: Subject to any disclaimer, the term of this patent is extended or adjusted under 35 U.S.C. 154(b) by 354 days.

(21) Appl. No.: 10/052,472

(22) Filed: Jan. 17, 2002

(65) Prior Publication Data

US 2003/0189164 A1 Oct. 9, 2003

(51) Int. Cl.[7] .............................. H01J 40/14; G01D 5/34
(52) U.S. Cl. ........................... 250/214 A; 250/214 LA; 250/231.13; 330/308
(58) Field of Search ...................... 250/214 A, 214 LA, 250/231.13, 231.14, 231.16, 214 R; 330/59, 308, 110; 327/514, 517

(56) References Cited

U.S. PATENT DOCUMENTS 4,654,525 A  3/1987 Ebina et al.
5,981,936 A  11/1999 Fujiie
5,982,206 A  11/1999 Tachio et al.
6,476,954 B1 * 11/2002 Nishizono .................... 398/202

OTHER PUBLICATIONS

"Notification of Transmittal of the International Search Report or the Declaration", corresponding PCT application No. PCT/US03/02033, International Searching Authority, European Patent Office, Jan. 24, 2003, 6 pages.

Sedra, Adel S., Smith, Kenneth C.; "Microelectronic Circuits" Fourth Edition, Oxford University Press, 1998, pp. 281–282, pp. 402–408.

* cited by examiner

Primary Examiner—Kevin Pyo
(74) Attorney, Agent, or Firm—Parsons Hsue & de Runtz LLP

(57) ABSTRACT

A first device comprising a first current mirror is used to amplify the output of a first photodetector. A second device comprising a current mirror arrangement is employed to amplify the output of a second photodetector. The outputs of the two devices are then compared to provide a signal useful for many applications, including that for determining the position of a rotating member or of a member in relative motion to another member. Preferably, no feedback action is used for the amplification of the output of at least one of the photodetectors.

15 Claims, 3 Drawing Sheets

PHOTODETECTION SYSTEM AND CIRCUIT FOR AMPLIFICATION

BACKGROUND OF THE INVENTION

This invention relates in general to photodetection systems.

Photodetection systems have been widely used in a number of different applications. For example, such systems have been used in weighing scales. Photodetection systems have also been used as optical encoders in conjunction with motors for determining the position of a rotating member during rotation.

One type of convention photodetection system used for the above-described application, is described in U.S. Pat. No. 4,654,525. According to this patent, an optical rotary encoder includes a circular slit plate having a number of slits located at the circumference of the plate, where the slits have a pitch P. A photodiode emits light towards one side of the slit plate and four photodiodes are placed on the other side of the slit plate to detect the light emitted by the light emitting diode through the slits. Output signals from the four photodiodes are applied to a detection circuit for determining the angular position and velocity of the rotating slit plate. In this manner, the angular position and velocity of a rotating shaft used to rotate the slit plate can be measured.

The amount of light detected by the photodiodes is proportional to the surface area of the photodiodes receiving light from the light emitting diode. Thus, in order to increase the strength of the signal detected by the photodiodes, it is preferable to employ photodiodes of large areas, or to employ multiple sets of smaller photodetectors. This, however, will increase the size of the optical head containing the photodiodes, which may be impractical for many applications. This is particularly the case for the increasingly popular portable electronic devices and in view of the modem trend to miniaturize electronic devices. Furthermore, a larger area photodetector causes the dark current to increase, thereby reducing the signal-to-noise ratio, and causes capacitance to increase, thereby reducing speed of devices.

Another technique to increase the intensity of the detected signal is to amplify the output of the photodetector, such as in the manner shown in FIG. 6 of U.S. Pat. No. 4,654,525. As shown in FIG. 6 of such patent, an operational amplifier with negative feedback is employed to amplify the output of each photodiode. The use of feedback, however, renders the detection circuit less stable. It is, therefore, desirable to provide an improved photodetection system where the above-described disadvantages are avoided or alleviated.

SUMMARY OF THE INVENTION

The stability in the detection circuit can be improved by simply not using feedback paths for processing the output of at least one of the photodetectors. Thus, the current generated by one photodetector may be converted into a voltage by means of a first circuit path that includes a transistor. The current provided by a second photodetector may be similarly converted into a second voltage by a transistor in a second circuit path. The two voltages so produced are then compared by a comparator to provide an output useful for many applications, such as in an optical encoder for determining the position of a member that is being rotated or otherwise caused to move relative to another member. This detection apparatus includes no feedback path for processing the output of at least one of the photodetectors and is therefore more stable, unlike those employing operational amplifiers with feedback for processing the outputs of all the photodetectors.

In order to reduce the surface area of the photodetector employed, a current mirror arrangement may be employed in a circuit to amplify the photodetector output. Thus, current from a photodetector is supplied to a first circuit path comprising a first transistor. A second circuit path comprises a second transistor. The first and second circuit paths are connected to form a current mirror arrangement. The two transistors are such that the current mirror arrangement provides a signal that is an amplified version of the output of the photodetector.

The above-described apparatus for amplifying an output of detector may then be used in a photodetection apparatus. Thus, a first device comprising a first current mirror is used to amplify the output of a first photodetector. A second device comprising a current mirror arrangement is employed to amplify the output of a second photodetector. The outputs of the two devices are then compared to provide a signal useful for many applications, including that for determining the position of a rotating member or of a member in relative motion to another member. Preferably, no feedback action is used for the amplification of the output of at least one of the photodetectors.

BRIEF DESCRIPTION OF THE DRAWINGS

For simplicity in description, identical components are identified by the same numerals in this application.

DETAILED DESCRIPTION OF THE EMBODIMENTS

Figure 1:
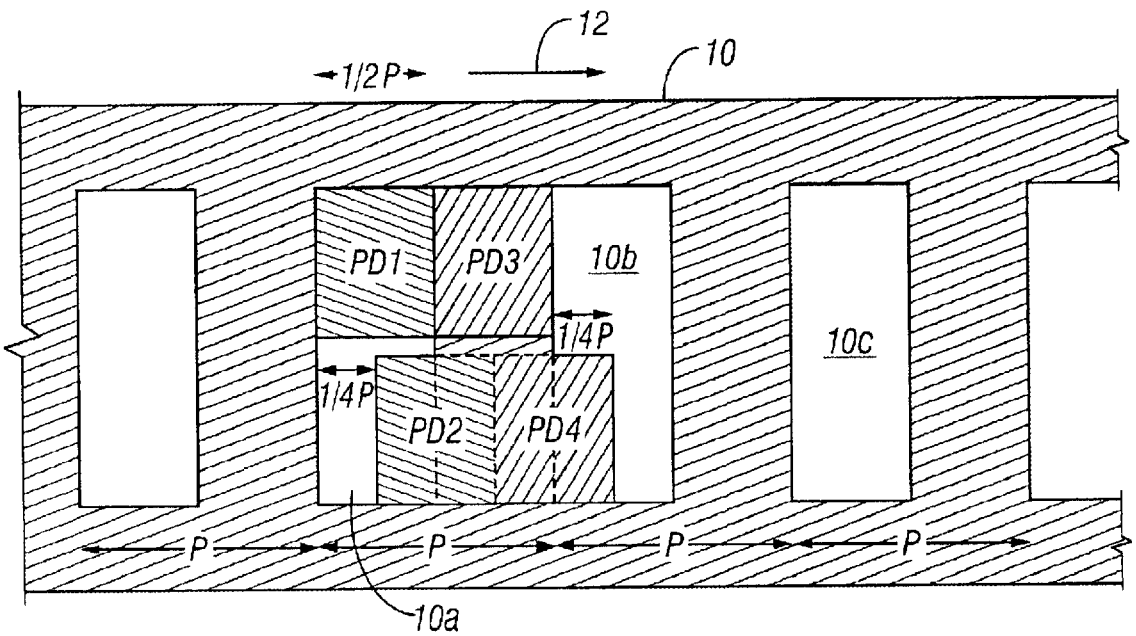
FIG. 1 is a schematic view of a slit plate in four photodetectors PD1, PD2, PD3 and PD4 useful for illustrating an aspect of the invention.

FIG. 1 is a schematic view of a slit plate and four photodetectors useful for illustrating the invention. As shown in FIG. 1, relative motion is caused between a slit plate 10 and four photodetectors PD1, PD2, PD3 and PD4. This relative motion may be caused by moving the slit plate 10 along arrow 12, or by moving the photodetectors in the opposite direction to arrow 12, or both. Such relative motion may be caused by a number of mechanisms, such as a motor (not shown), or other rotation devices. Slit plate 10 defines therein a number of slits (e.g. 10a, 10b and 10c) that are spaced with a pitch P, where each of the slits has a width that is approximately one-half (½) of P as shown in FIG. 1. Each of the four photodetectors has a width substantially the same as the width of the slits, or, in other words, substantially ½P. For example, as shown in FIG. 1, PD1 and PD3 are aligned substantially in the direction of relative motion (e.g. arrow 12) and spaced at an interval substantially corresponding to ½P. Similarly, PD2 and PD4 are aligned substantially in the direction of relative motion (e.g. arrow 12) and spaced at an interval substantially corresponding to ½P. Therefore, when relative motion is caused between the slit plate 10 and the four detectors, the four detectors and different portions thereof become exposed to radiation travelling through the slits. Thus, in the configuration shown in FIG. 1, substantially the whole area of the detector PD1 is exposed through the slit 10a while only about half of the detector PD2 is exposed through the same slit. Substantially the entire detector PD3 is shielded by plate 10. The left half of the detector PD4 is shielded by the plate 10 while the right-half of the detector is exposed through slit 10b. By detecting the outputs of the four detectors, it is possible to determine the precise position of slit plate 10 relative to the photodetectors. This is performed by means of the detection circuits in FIGS. 3A and 3B, and, alternatively, by the detection circuit in FIG. 4.

Figure 2:
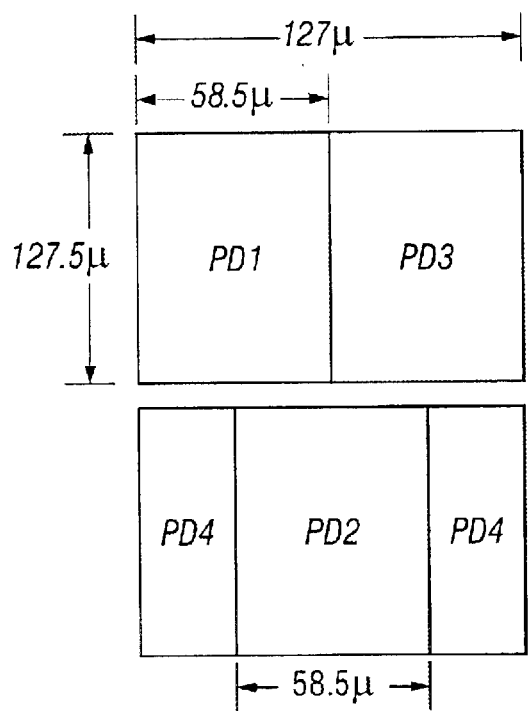
FIG. 2 is a schematic view of four photodetectors in an optical head for detecting the position of a member in relative motion to another member as illustrated in FIG. 1, but where the photodetectors are configured slightly differently from that of FIG. 1.

FIG. 2 is a schematic view of four photodetectors arranged in a manner slightly different from that of FIG. 1. Thus, the right half of photodetector PD4 of FIG. 1 is located to the left of PD3 instead in FIG. 2. This, however, does not alter the relative phase relation between the output of PD4 relative to those of the other three photodetectors, as would become clear from the discussion below. Obviously, the dimensions and arrangement of the four detectors are not limited to those indicated in FIGS. 1 and 2 and other dimensions and arrangements are possible.

Figure 3A:
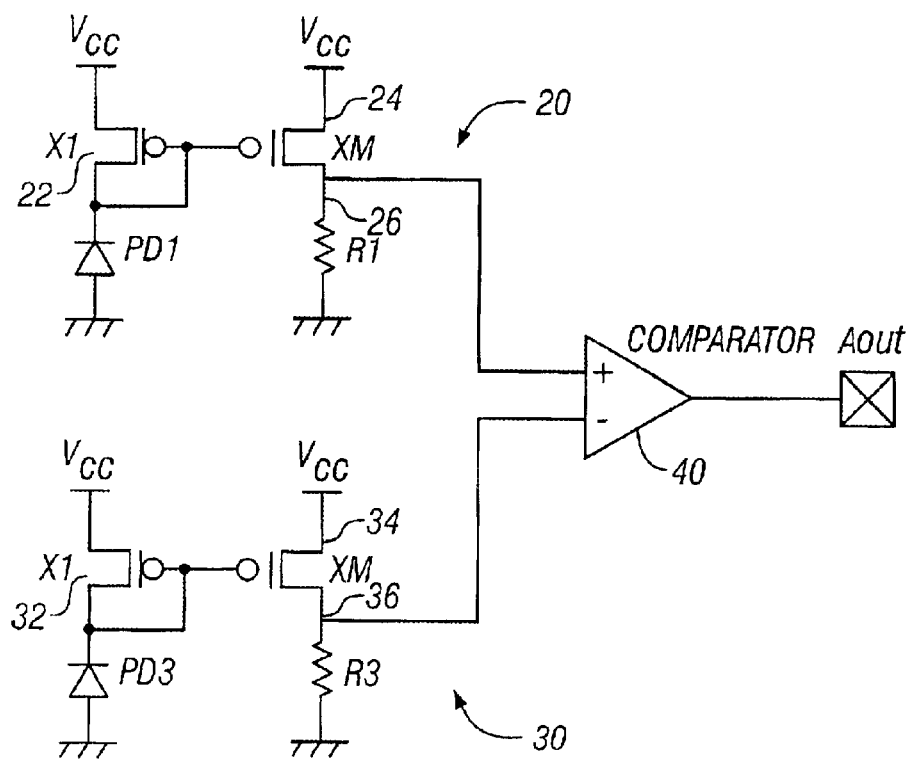
FIG. 3A is a schematic view of a circuit to provide an output from the outputs of two of the four detectors of FIG. 2 useful for indicating the position of a member in relative motion to another member to illustrate one embodiment of the photodetector processing circuit.

As shown in FIG. 3A, the output of photodetector PD1 is amplified by a current mirror arrangement which comprises two circuit paths. The output current from the photodetector PD1 is supplied to a first one of the two circuit paths comprising a transistor 22. Preferably, the photodetector PD1 is in the first circuit path as shown in FIG. 3A. Thus, in this first circuit path, the drain and source of transistor 22 are connected respectively to a reference voltage Vcc and to one terminal of the photodiode PD1 with the other terminal of PD1 connected to ground. The second circuit path comprises a second transistor 24 whose drain and source are connected to Vcc and a resistor R1, respectively, with the other terminal of R1 connected to ground. The gates of the two transistors 22, 24 are connected together, where the gates are also connected to the source of transistor 22 to form a current mirror arrangement. The current mirror arrangement in circuit 20 provides at node 26 a voltage which is proportional to the current provided by the photodiode PD1. Thus, as known to those skilled in the art, in a current mirror arrangement such as in circuit 20, where transistors 22 and 24 are MOSFETs, the current flowing in the second current path (comprising transistor 24 and resistor R1) in the arrangement bears a ratio to the current flowing in the first circuit path (comprising transistor 22 and PD1) in the arrangement by the ratio of the width/length ratio of transistor 24 to the width/length ratio of transistor 22. Therefore, if the width/length ratio of transistor 24 is M times that of transistor 22, the current flowing between the drain and source of transistor 24 is substantially M times that flowing between the drain and source of transistor 22. Resistor R1 converts this current into a voltage drop between node 26 and ground, so that the voltage at node 26 is an amplified version of the output current of PD1.

Circuit 30 comprising a second current mirror arrangement and the photodetector PD3 has a construction similar to circuit 20. Thus, the first circuit path of circuit 30 includes transistor 32 and photodiode PD3 and the second circuit path comprises transistor 34 and resistor R3. The two circuit paths are connected together, with the gates of the two transistors connected together and to the source of transistor 32 in a current mirror arrangement. This current mirror arrangement in circuit 30 also provides at node 36 an output voltage that is an amplified version of the current provided by PD3, where the amplification factor is given by the ratio of the width/length ratio of transistor 34 to the width/length ratio of transistor 32. Preferably, the two circuits 20, 30 provide substantially the same amplification, in this case M, to the outputs of photodetectors PD1 and PD3. The two output voltages at terminals or nodes 26 and 36 are compared by comparator 40 to provide an output Aout as shown in FIG. 3A.

From FIG. 1, it will be observed that the outputs of the two detectors PD1 and PD3 are in opposite phase when there is relative motion along arrow 12 between the slit plate 10 and these two photodetectors. Therefore, the output of comparator 40 is in the shape of a square wave where the output is of a high value when the voltage at node 26 exceeds that at node 36 and a low value when the opposite is true, with the transitions between the high and low values occurring at points when the voltages at the two nodes are substantially the same.

Figure 3B:
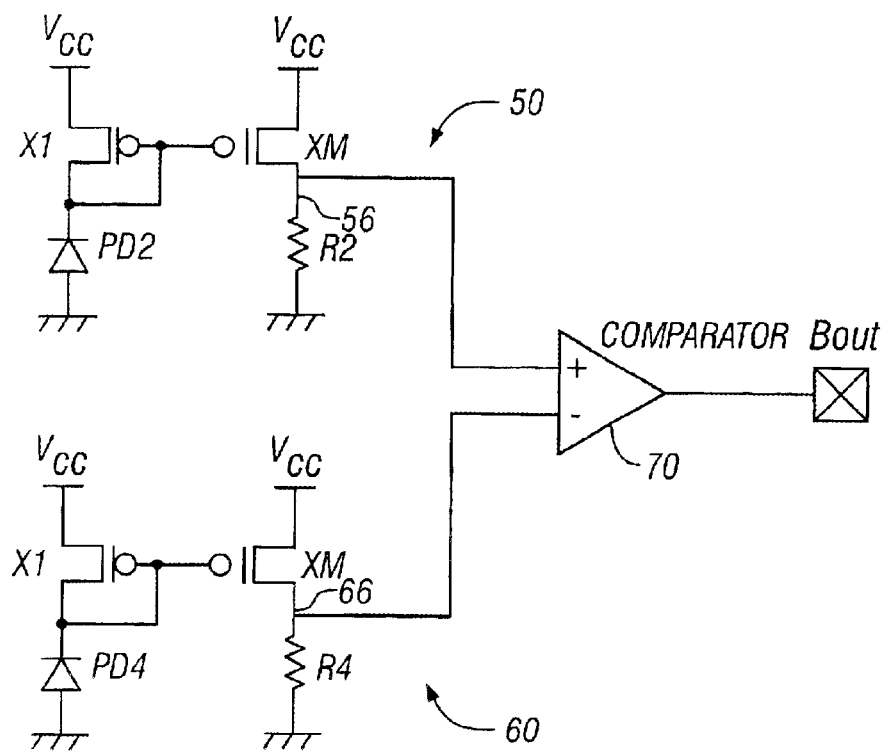
FIG. 3B is a circuit similar to that of FIG. 3A for processing the outputs of the remaining two photodetectors of FIG. 2 also to provide an output useful for indicating the position of the member in relative motion to another member to illustrate one embodiment of the photodetector processing circuit.

The current arrangements in circuits 50 and 60 are substantially the same as those of circuits 20 and 30, so that circuit 50 amplifies the output of photodetector PD2 and circuit 60 amplifies the output of photodetector PD4 and provides the outputs at nodes 56 and 66. Therefore, the output of comparator 70 provides an output Bout which is also a square wave similar in form to Aout described above. In reference to FIGS. 1 and 2, however, since PD2 and PD4 are displaced by about ¼ P relative to PD1 and PD3 respectively along arrow 12, PD2 and PD4 it will be observed that the output of photodetector PD2 is substantially 90° out of phase with the output of photodetector PD1, and the output of photodetector PD4 is substantially 90° out of phase with the output of photodetector PD3, when relative motion is caused between the slit phase 10 and the four photodetectors along arrow 12. Therefore, the output Bout of comparator 70 will be substantially 90° out of phase with the square wave output Aout. These two outputs may be used to obtain information regarding the relative position of the slit plate 10 to the photodetectors.

Where the relative motion between the slit plate 10 and the photodetectors is controlled by a motor, for example, the outputs Aout and Bout may be used to monitor the position of the slit plate or of the photodetectors as one or the other is moved as a consequence of the motor, and the circuits in FIGS. 3A, 3B form an optical encoder. In addition to applications in motors or other rotational devices, the invention is also useful for other instruments and industry automation.

The circuits 20, 30, 50 and 60 are advantageous in that they do not employ any feedback action. The use of feedback may render the circuit unstable. By choosing the amplification factor M to be a big number, it is possible to reduce the size of the four photodetectors. With a smaller size photodetector the dark current is also reduced, thereby improving the signal-to-noise ratio. Smaller size photodetectors also reduces the size of the overall circuit, thereby reducing the cost. When the surface area of the photodetector in semiconductor dies is reduced, it also reduces the capacitance of the circuit, thereby improving the speed of the circuit. While p-channels transistors such as 22, 24, 32, 34 are shown in FIGS. 3A, 3B, it will be understood that n-channel transistors can be used instead and are within the scope of the invention. When n-channel transistors are used instead, the current arrangement will be somewhat different from that shown in FIGS. 3A, 3B and is within the scope of the invention.

Figure 4:
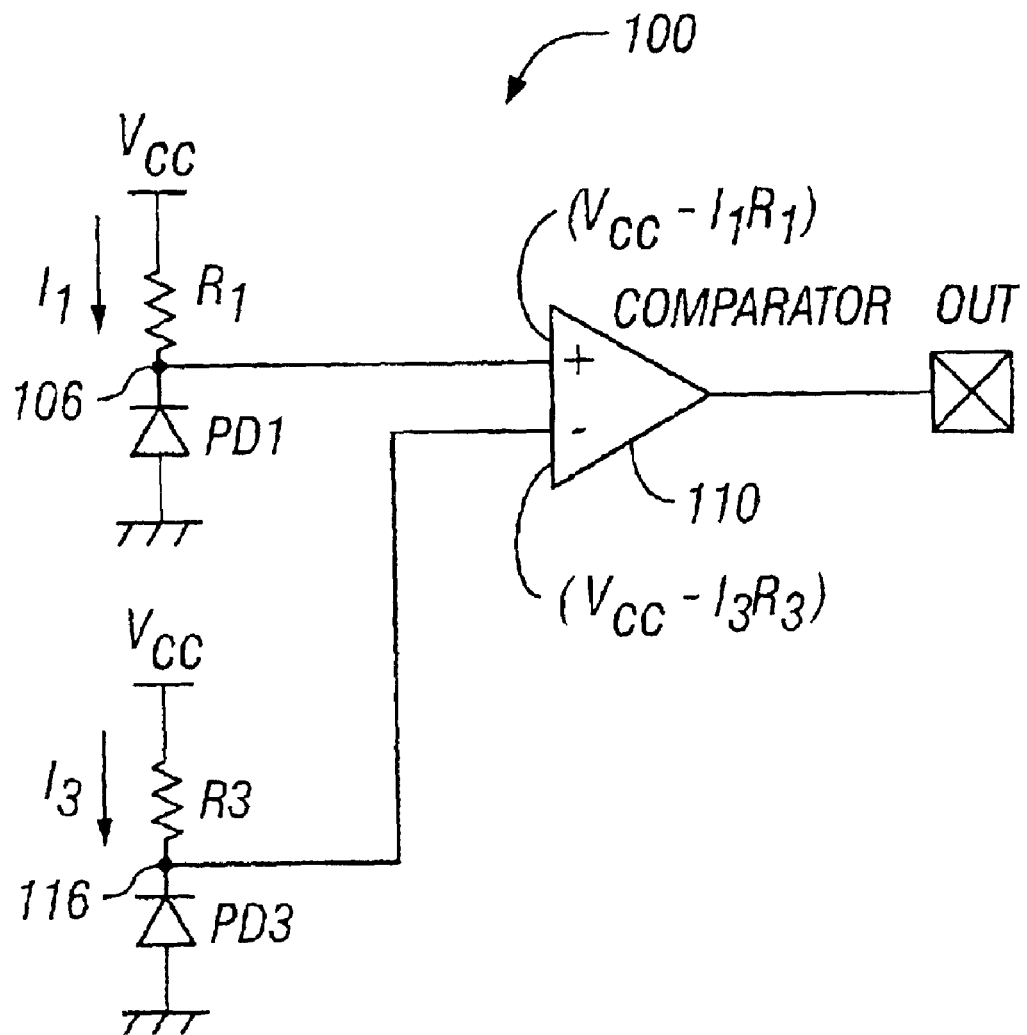
FIG. 4 is a schematic view of a detection circuit for processing the outputs of two of the photodetectors of FIG. 2 to illustrate an alternative embodiment of the invention.

FIG. 4 is a schematic circuit diagram illustrating an alternative embodiment 100 of the invention. As shown in FIG. 4, the photodetector PD1 is in the circuit path between the reference voltage Vcc and ground, with resistor R1 connecting the photodetector PD1 to Vcc. The voltage at node 106 is equal to Vcc-$I_1R_1$, where $I_1$ is the current provided by photodetector PD1. Similarly, the voltage at node 116 is equal to Vcc-$I_3R_3$, where $I_3$ is the current provided by photodetector PD3. Thus, the output OUT of comparator 100 is ($I_3R_3-I_1R_1$), from which the position of the slit plate relative to PD1 and PD3 can be determined. A similar circuit may be used to process the outputs of PD2 and PD4. In such circuit arrangement, no feedback action is employed to process the outputs of the four photodetectors.

While the invention has been described by reference to various embodiments, it will be understood that modification changes may be made without departing from the scope of the invention which is to be defined only by the appended claims or their equivalents. All references referred to herein are incorporated by reference in their entireties.

What is claimed is:

1. An apparatus for comparing outputs of a first and a second photodetector, comprising:
    a first circuit path comprising a first transistor, a current from said first photodetector being supplied to the first circuit path; and
    a second circuit path comprising a second transistor, said two transistors connected to form a current mirror arrangement, said two transistors being such that the current mirror arrangement provides a signal that is an first amplified version of the output of the first photodetector;
    a third circuit path comprising a third transistor, a current from said second photodetector being supplied to the third circuit path;
    a fourth circuit path comprising a fourth transistor, said third and fourth transistors connected to form a current mirror arrangement, said third and fourth transistors being such that the current mirror arrangement provides for the second device an output signal that is a second amplified version of the output of the second photodetector; and
    a comparator directly comparing the first and second amplified versions of the outputs of the first and second photodetectors without negative feedback.

2. The apparatus of claim 1, wherein said first photodetector is in the first circuit path.

3. The apparatus of claim 1, said transistors comprising MOS transistors, wherein said second transistor has a width/length ratio that is larger than that of the first transistor.

4. A photodetection apparatus, comprising:
    a first photodetector;
    a first device comprising:
        (a) a first circuit path comprising a first transistor, a current from said first photodetector being supplied to the first circuit path; and
        (b) a second circuit path comprising a second transistor, said two transistors connected to form a current mirror arrangement, said first and second transistors being such that the current mirror arrangement provides for the first device an output signal that is an amplified version of the output of the first photodetector;
    a second photodetector; and
    a second device comprising:
        (c) a third circuit path comprising a third transistor, a current from said second photodetector being supplied to the third circuit path; and
        (d) a fourth circuit path comprising a fourth transistor, said third and fourth transistors connected to form a current mirror arrangement, said third and fourth transistors being such that the current mirror arrangement provides for the second device an output signal that is an amplified version of the output of the second photodetector; and
    a comparator directly comparing the first and second amplified versions of the outputs of the first and second photodetectors without negative feedback.

5. The apparatus of claim 4, wherein said first photodetector is in the first circuit path.

6. The apparatus of claim 4, wherein said second photodetector is in the third circuit path.

7. The apparatus of claim 4, said first and second transistors comprising MOS transistors, wherein said second transistor has a width/length ratio that is larger than that of the first transistor.

8. The apparatus of claim 4, said third and fourth transistors comprising MOS transistors, wherein said fourth transistor has a width/length ratio that is larger than that of the third transistor.

9. The apparatus of claim 4, wherein said first and/or second photodetectors are photodiodes.

10. The apparatus of claim 4, wherein the apparatus is used in an optical encoder having a slit plate, said plates comprising a plurality of slits with a predetermined pitch, wherein relative motion is caused between the plate and the photodetectors, and wherein said photodetectors are aligned in a direction of the relative motion and spaced at an interval corresponding to ½ said predetermined pitch of the slits.

11. The apparatus of claim 1, wherein said second photodetector is in the third circuit path.

12. The apparatus of claim 1, wherein said first and/or second photodetectors are photodiodes.

13. The apparatus of claim 1, wherein the apparatus is used in an optical encoder having a slit plate, said plates comprising a plurality of slits with a predetermined pitch, wherein relative motion is caused between the plate and the photodetectors, and wherein said photodetectors are aligned in a direction of the relative motion and spaced at an interval corresponding to ½ said predetermined pitch of the slits.

14. An optical encoder having a slit plate, said plates comprising a plurality of slits with a predetermined pitch, wherein relative motion is caused between the plate and a first and a second photodetector, comprising:
    a first circuit path comprising a first transistor, a current from said first photodetector being supplied to the first circuit path; and a second circuit path comprising a second transistor, said two transistors connected to form a current mirror arrangement, said two transistors being such that the current mirror arrangement provides a signal that is an first amplified version of the output of the first photodetector;

a third circuit path comprising a third transistor, a current from said second photodetector being supplied to the third circuit path; and a fourth circuit path comprising a fourth transistor, said third and fourth transistors connected to form a current mirror arrangement, said third and fourth transistors being such that the current mirror arrangement provides for the second device an output signal that is a second amplified version of the output of the second photodetector;

wherein said photodetectors are aligned in a direction of the relative motion and spaced at an interval corresponding to ½ said predetermined pitch of the slits.

15. The encoder of claim 14, further comprising a comparator directly comparing the first and second amplified versions of the outputs of the first and second photodetectors without negative feedback.

* * * * *